April 23, 1946. J. L. DRAKE ET AL 2,398,886

LAMINATED GLASS STRUCTURE

Filed May 15, 1942

Inventors
JOHN L. DRAKE.
GEORGE B. WATKINS.
By Frank Fraser
Attorney

Patented Apr. 23, 1946

2,398,886

UNITED STATES PATENT OFFICE 2,398,886

LAMINATED GLASS STRUCTURE

John L. Drake and George B. Watkins, Toledo, Ohio, assignors to Libbey-Owens-Ford Glass Company, Toledo, Ohio, a corporation of Ohio Application May 15, 1942, Serial No. 443,090

4 Claims. (Cl. 154—2.71)

The present invention relates to improvements in laminated glass structures.

The type of laminated glass structure to which this invention more particularly relates comprises two sheets of glass and an interposed layer of thermoplastic adherent thereto to provide a composite structure and in which the surface area of the plastic interlayer is greater than the surface area of the glass sheets so that it extends beyond the edges of said sheets to provide a flexible attaching and sealing flange.

This laminated structure is adapted to be mounted in the opening to be glazed by clamping the extended portion only of the plastic in the supporting frame as distinguished from clamping the marginal portions of the glass sheets. Such a structure is of particular utility in glazing openings in airplanes and other aircraft where the requirements are unusually stringent, although it may be used in glazing any window or windshield construction.

By clamping the plastic attaching flange only, the laminated structure has a certain resiliency or freedom of movement relative to the supporting frame whereby torsion and shock to which the airplane may be subjected will be "cushioned" and for all practical purposes will not be transmitted directly to the glass, thereby reducing or eliminating the tendency of cracking or shattering thereof from such causes. In other words, there is provided a flexible mounting to absorb torsional strain and vibration and to reduce breakage resulting from the imposition of mechanical strains on the glass during installation or in service.

Another advantage of this type of laminated structure, particularly when used in airplanes, is that it can be mounted in a supporting frame with the outer face of said structure flush with the outer surface of said frame, whereby to reduce air resistance and permit more perfect streamlining.

One of the special uses of a laminated glass structure of this type is for glazing stratosphere planes in which pressurized cabins, turrets or other compartments are provided to obviate the necessity for each occupant of the plane having an individual oxygen supply. Ordinarily, in this type of structure, the two sheets of glass have the same surface area and are so arranged that the edges thereof align with one another. Although the extended plastic laminated glass structure above described comes close to achieving the desired objectives of a flush mounting and flexibility in the glass installation, it is not entirely satisfactory in all respects since it relies solely upon the plastic interlayer for stability and anchorage in the aircraft. For instance, the plastic interlayers now used tend to "flow" at relatively moderate temperatures, and this plastic flow is governed by time, temperature, and pressure. The pressure is considerable in the extended plastic mounting, since the attaching flange bears the glass load and also must withstand pressure differentials between the inside and outside of the plane. Pressure tests conducted on different types of mountings for aircraft laminated glass indicate that the extended plastic unit for airplane glazing, especially for pressurized cabins, is objectionable because of plastic flow and unsatisfactory solution of the problem of edge deflection.

In an endeavor to overcome the above objections, it has been proposed to have one of the glass sheets relatively larger than the other to provide a so-called "stepped" arrangement, the larger glass sheet being disposed inwardly of the plane and adapted to bear against a portion thereof to take the thrust or pressure from the inside of the plane and thereby reduce edge deflection as well as to prevent the entire structure from being forced or blown outwardly by the internal presure built up in the plane. However, in such structure, no provision is made for taking the thrust or pressure from the outside of the plane and which may result in edge deflection and even at times be sufficient to force the structure inwardly to weaken or shear the extended plastic.

It is an aim of this invention to provide an improved extended plastic laminated glass structure which will take the thrust or pressure in both directions and thereby firmly retain the structure in place against forcible displacement as well as minimizing edge deflection in the extended plastic and the weakening or shearing thereof.

Another object of the invention is to provide such a laminated glass structure which will take the thrust or pressure in both directions while, at the same time, maintaining the advantages of flexibility and flush mounting.

A further object of the invention is to provide such a laminated glass structure in which the two sheets of glass are associated with one another in such a manner that one sheet of glass takes the pressure or thrust in one direction and the other sheet the pressure or thrust in the opposite direction.

Other objects and advantages of the invention will become more apparent during the course of the following description, when taken in connection with the accompanying drawing.

In the drawing, wherein like numerals are employed to designate like parts throughout the same:

Figure 1:
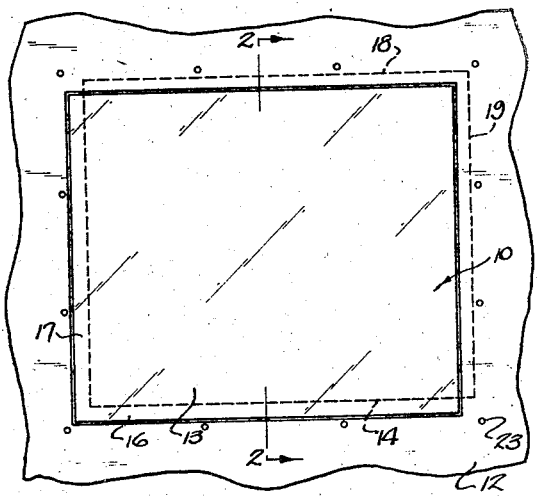
Fig. 1 is a front view of one form of laminated glass structure provided by the invention.
Figure 2:
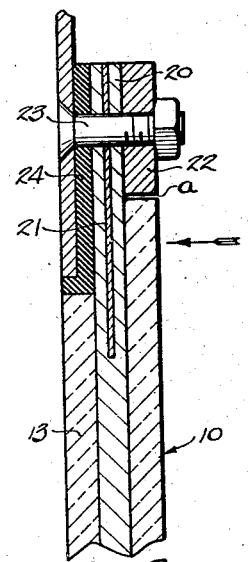
Fig. 2 is a vertical transverse section therethrough taken substantially on line 2—2 of Fig. 1.

With reference now to the drawing and particularly to Figs. 1 and 2, there is shown a laminated structure 10 mounted in a supporting frame 11 carried by the skin 12 of the plane. The laminated structure 10 comprises the two sheets of glass 13 and 14 and interposed layer of thermoplastic 15 adherent thereto. The glass sheets 13 and 14 may consist of ordinary plate or window glass and may be either fully tempered or semi-tempered or any desired combination of glass sheets may be used. The plastic interlayer 15 is preferably formed of a synthetic resin material, such as, for example, a suitably plasticized polyvinyl acetal resin. However, different plastics varying in thickness and physical characteristics may be employed and the invention is not limited to the use of any particular resin, class of resins, cellulosic derivatives or the like.

In accordance with the invention, the two sheets of glass 13 and 14 are of the same shape and size and are displaced diagonally or offset relative to one another as clearly shown in Fig. 1. In other words, the glass sheet 13 projects beyond the glass sheet 14 at the bottom thereof and also along one side as indicated at 16 and 17 respectively, while the glass sheet 14 projects beyond glass sheet 13 at the top thereof and also at the other side as indicated at 18 and 19 respectively. This results in a so-called semi-stepped arrangement, in that each glass sheet extends beyond the other glass sheet at two adjacent edges.

The glass sheets 13 and 14 are also of lesser surface area than the plastic interlayer 15 so that the plastic interlayer extends beyond all of the edges of both glass sheets to provide a flexible attaching and sealing flange 20 which is clamped in the supporting frame 11. Although not essential to the present invention, it is preferred that metal inserts 21 be embedded in the extended plastic. These metal inserts may consist of relatively thin strips of preferably flexible metal embedded in the extended plastic and projecting inwardly of the edges of the glass sheets.

In mounting the laminated structure 10, the glass sheet 13 is disposed outwardly and arranged flush with the outer surface of the skin 12 of the plane. The extended plastic 20 is then clamped against the skin of the plane by the frame members 22 which are disposed outwardly of the edges of the inner glass sheet 14 and through which clamping bolts or the like 23 may be passed, said bolts also passing through the extended plastic attaching flange 20 and metal inserts 21. The frame members 22 may consist of individual strips disposed at the four sides of the structure or they may be secured to or formed integral with one another to provide a continuous collar. Disposed between the plastic attaching flange 20 and skin 12 of the plane is a gasket 24 preferably of rubber, rubber composition or the like. The gasket 24 may also be formed of one piece or of a plurality of separate strips and is provided with a forwardly directed flange 25 disposed opposite the peripheral edges of the cutter glass sheet 13.

Due to the diagonal displacement of the glass sheets 13 and 14, the projecting marginal portions 16 and 17 of outer glass sheet 13 will overlap the frame members 22 at the bottom and one side of the structure, while the projecting marginal portions 18 and 19 of inner glass sheet 14 will overlap the skin 12 of the plane as shown in Fig. 2. With such an arrangement, the marginal portion 16 and 17 of glass sheet 13 will take the thrust or pressure from the outside of the plane and will bear against the respective frame members 22, while the marginal portions 18 and 19 of glass sheet 14 will take the thrust or pressure from the inside of the plane and bear against the skin 12 thereof.

As a result, accidental or forcible displacement of the laminated structure 10 from the supporting frame 11 from either the inside or outside of the frame will be effectively prevented. In addition, the projecting marginal portions of the glass sheets 13 and 14 which overlap the frame members 22 and skin 12 of the plane will improve the stability of the structure and the mounting thereof in the plane to minimize edge deflection of the extended plastic and the liability of tearing or shearing thereof. These advantages are obtained while, at the same time, permitting a certain amount of floating movement of the structure within the supporting frame to thereby take advantage of the flexibility of the plastic attaching flange 20. Thus, in mounting the structure, a relatively small space or gap $a$ is left between the edges of the inner glass sheet 14 and frame members 22. As a result, when the structure is subjected to outside pressure, it will be held against inward movement at the bottom and one side edge thereof by the projecting marginal portion 16 and 17 of outer glass sheet 13, while the top and opposite side of the structure will be permitted to move inwardly to obtain a so-called rocking or pivotal action. On the other hand, when pressure is applied to the inside of the structure, it will be held against outward movement at the top and one side edge theretof by the projecting marginal portions 18 and 19 of inner glass sheet 14, while the bottom and opposite side of said structure will be permitted to move outwardly. Consequently, there is provided a flexible mounting for the structure permitting it to pivot or rock within the opening and thereby minimize strain in the laminated glass upon weaving or twisting of the plane in flight.

Figure 3:
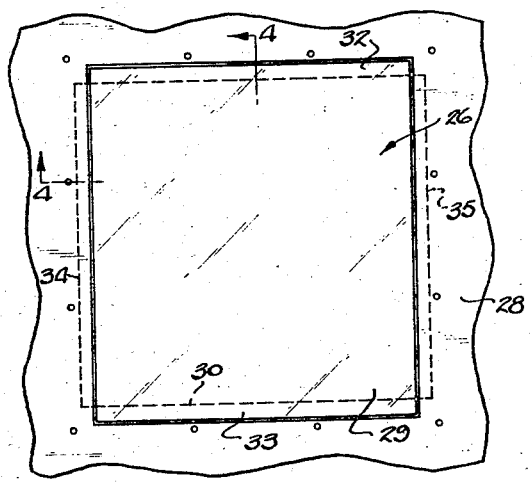
Fig. 3 is a front view of a second laminated structure also embodying the invention.
Figure 4:
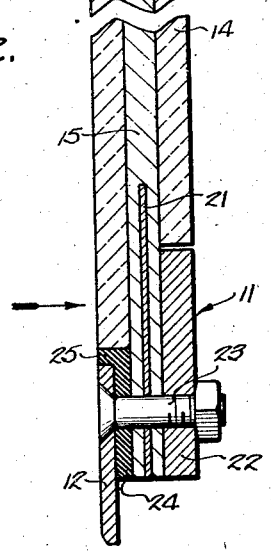
Fig. 4 is a transverse section therethrough taken substantially on line 4—4 of Fig. 3.
Figure 4:
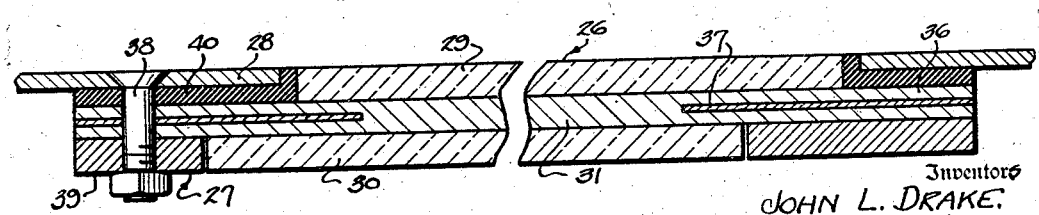

In the embodiment of the invention illustrated in Figs. 3 and 4, the same advantages set forth above are obtained by a slightly different arrangement of the glass sheets. As here shown, the laminated structure is designated in its entirety by the numeral 26 and is mounted in a frame 27 carried by the outer wall or skin 28 of the plane. The laminated structure 26 comprises the two sheets of glass 29 and 30 and interposed layer of thermoplastic 31 adherent thereto. The two glass sheets 29 and 30 are rectangular and associated with one another in such a manner that the outer sheet 29 extends a short distance beyond inner sheet 30 at the top and bottom thereof as indicated at 32 and 33, while the inner sheet 30 projects a short distance beyond outer sheet 29 at the opposite sides as indicated at 34 and 35. The plastic interlayer 31 extends beyond the edges of both sheets of glass to provide the flexible attaching flange 36 within which is preferably embedded the metal inserts 37.

The laminated structure 26 is mounted in the frame 27 in substantially the same manner as in Fig. 2 by means of clamping bolts or the like 38 which pass through the frame members 39, extended plastic 36, rubber gasket 40, and skin 28 of the plane. In this case, the projecting end portions 32 and 33 of the outer glass sheet 29 overlap the frame members 39 and thereby take the inward thrust or pressure, while the projecting end portions 34 and 35 of the inner glass sheet 30 overlap the skin 28 of the plane and take the outward thrust or pressure. This form of the invention also provides for a certain amount of flexibility in the laminated structure to minimize the introduction of localized strains in the unit when the plane is in flight.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

We claim:

1. A laminated glass structure comprising two sheets of glass and an interposed layer of thermoplastic adherent thereto, said glass sheets being so arranged relative to one another that one sheet extends beyond the other sheet at one edge of the structure while said second sheet extends beyond the first sheet at another edge of the structure, the plastic interlayer extending beyond the edges of both sheets of glass.

2. A laminated glass structure comprising two sheets of glass and an interposed layer of thermoplastic adherent thereto, said glass sheets being offset relative to one another in such a manner that one sheet extends beyond the other sheet at two edges of the structure while said second sheet extends beyond the first sheet at the other two edges of the structure, the plastic interlayer extending beyond the edges of both sheets of glass.

3. A laminated glass structure comprising two sheets of glass and an interposed layer of thermoplastic adherent thereto, said glass sheets being displaced diagonally with respect to one another so that one sheet extends beyond the other sheet at two adjacent edges of the structure while said second sheet extends beyond the first sheet at the other two adjacent edges of the structure, the plastic interlayer extending beyond the edges of both sheets of glass.

4. A laminated glass structure comprising two sheets of glass and an interposed layer of thermoplastic adherent thereto, said glass sheets being substantially rectangular and so arranged that one sheet extends beyond the other sheet at two opposite edges of the structure while said second sheet extends beyond the first sheet at the other two opposite edges of the structure, the plastic interlayer extending beyond the edges of both sheets of glass.

JOHN L. DRAKE.
GEORGE B. WATKINS.